(12) United States Patent
Kim et al.

(10) Patent No.: US 6,683,862 B1
(45) Date of Patent: Jan. 27, 2004

(54) VIRTUAL PILOT CHANNEL GENERATING APPARATUS AND ITS OPERATING METHOD FOR SUPPORTING EFFECTIVE HAND-OFF BETWEEN FREQUENCIES IN CDMA MOBILE COMMUNICATIONS SYSTEM

(76) Inventors: Jung Sang Kim, Bokyoung Villa 5-102, Shinha-ri, Bubal-eub, Ichon-shi, Kyoungki-do (KR), 467-860; Jon Ho Park, Hyundai 2 Apt 871-902, San 149-1, Ami-ri, Bubal-eub, Ichon-shi, Kyoungki-do (KR), 467-860

( * ) Notice: Subject to any disclaimer, the term of this patent is extended or adjusted under 35 U.S.C. 154(b) by 0 days.

(21) Appl. No.: 09/020,165

(22) Filed: Feb. 6, 1998

(30) Foreign Application Priority Data

Dec. 24, 1997 (KR) .............................................. 97-73091

(51) Int. Cl.7 ................................................. H04J 13/00
(52) U.S. Cl. ....................... 370/342; 370/331; 370/335; 370/441; 455/421; 455/436
(58) Field of Search ................................. 370/203, 210, 370/320, 331, 332, 335, 342, 441, 479; 375/267, 297; 455/276.1, 279.1, 421, 422, 436, 506

(56) References Cited

U.S. PATENT DOCUMENTS

| | | | | |
|---|---|---|---|---|
| 4,901,307 A | * | 2/1990 | Gilhousen et al. | 370/320 |
| 5,345,467 A | | 9/1994 | Lomp et al. | 375/1 |
| 5,649,000 A | * | 7/1997 | Lee et al. | 370/331 |
| 5,663,956 A | * | 9/1997 | Schilling | 370/335 |
| 5,838,733 A | * | 11/1998 | Bruckert | 375/297 |
| 5,901,145 A | * | 5/1999 | Sawyer | 370/332 |

* cited by examiner

*Primary Examiner*—Dang Ton
*Assistant Examiner*—Shick Hom

(57) ABSTRACT

A virtual pilot channel generating apparatus and its operating method for supporting effective hand-off between frequencies in a CDMA mobile communications system, in which, when base stations A and B use frequency channels different from each other and a user moves from the base station A to base station B, pilot information the same as CDMA allocation frequency used in the base station A is supplied to the hardware of the base station B, and the hardware of the base station B transmits a virtual pilot channel identical to CDMA allocation channel used in the base station A, to allow the user's mobile to simultaneously monitor power intensities of the pilot channels of the base stations A and B, initiating smooth hand-off.

4 Claims, 3 Drawing Sheets

VIRTUAL PILOT CHANNEL GENERATING APPARATUS AND ITS OPERATING METHOD FOR SUPPORTING EFFECTIVE HAND-OFF BETWEEN FREQUENCIES IN CDMA MOBILE COMMUNICATIONS SYSTEM

BACKGROUND OF THE INVENTION

1. Field of the Invention

The present invention relates to a virtual pilot channel generating apparatus and its operating method for supporting effective hand-off between frequencies in a code division multiple access (CDMA) mobile communications system, specifically, to a virtual pilot channel generating apparatus and its operating method, which periodically sets information determining a CDMA frequency allocation channel in one hardware, to allow one piece of pilot information to be commonly used in a plurality of CDMA frequency allocation channels, thereby effectively supporting hand-off between frequencies.

2. Discussion of Related Art

In general, a base station in a CDMA mobile communications system can use multiple CDMA channels, not being overlapped. The number of CDMA channels used by a specific base station and their frequency bands are determined with regard to a method of allocating frequency for mobile communications and to the estimated number of users in an area where the base station will be established. Accordingly, frequency channels used by base stations located adjacent to the specific base station may be differently allocated.

When a certain user moves from the coverage area of a base station A to the coverage area of a base station B in the aforementioned CDMA mobile communications system, the service provider is changed from the base station A to the base station B, and communication channel is converted from the one used by the user in the base station A to the one available in the base station B. This is called hand-off. Smooth handing-off is an essential element for improving the quality of the mobile communications service. To perform the handing-off, the user's mobile monitors a pilot channel transmitted from each base station. This is because that the mobile determines the point of time at which the communication channel is changed, that is, a handing-off point, based on the power intensity of the pilot channel received from the two base stations A and B, regarding that the power intensity of the pilot channel received by the mobile is decreased as the mobile becomes more distant from the base station transmission antenna since the pilot channel is transmitted from each base station with an uniform power all the time.

In the above-described method of determining the handing-off point according to the power intensity when a signal is transmitted from each base station to the mobile, there is a problem in the determination of exact handing-off point between base stations which use different frequencies because the amount of reduction in the power of signals transmitted from the base stations to the mobile depends on topography and disturbance element. To solve this problem, there have been continuously studying and developing methods for performing smooth handing-off. One of those is disclosed in U.S. Pat. No. 5,345,467 in which an apparatus for controlling hand-off of radio devices includes first and second matched filters for matching an antenna to a signal output from first and second base stations, first and second detectors for detecting a reception signal and a comparator for comparing the signals received from the two base stations, thereby determining the handing-off point according to the difference in receiving time of the signals received from the two base stations.

This technique can determine the handing-off point more exactly than the aforementioned conventional technique which determines the handing-off point using electric field intensity (power intensity). With the conventional hand-off methods including the technique of U.S. Pat. No. 5,345,467, however, the mobile can search for only one CDMA channel frequency. Thus, when the base stations A and B use different CDMA channel frequencies, it is impossible to monitor the power intensity of the pilot channel of the base station where hand-off will be completed, obstructing the initiation of smooth hand-off between frequencies.

SUMMARY OF THE INVENTION

Accordingly, the present invention is directed to a virtual pilot channel generating apparatus and its operating method for supporting effective hand-off between frequencies in a CDMA mobile communications system that substantially obviates one or more of the problems due to limitations and disadvantages of the related art.

An object of the present invention is to provide a virtual pilot channel generating apparatus and its operating method for effectively supporting hand-off between frequencies in a CDMA mobile communications system, which periodically sets in the hardware of one base station pilot information which is the same as CDMA allocation frequency used by another base station, that is, information determining CDMA frequency allocation channel, to allow one piece of pilot information to be commonly used by a plurality of CDMA frequency allocation channels, performing effective hand-off between frequencies in the CDMA mobile communications system.

The pilot channel commonly used in the plurality of CDMA frequency allocation channels is called a virtual pilot channel. The virtual pilot channel generating apparatus according to the present invention includes: source supplying means for supplying a source required for generating a virtual pilot channel; a splitter for splitting information on the source provided by the source supplying means into a plurality of signals, the splitter being connected to the signal output port of the source supplying means; and a plurality of signal generating sections for receiving the plurality of signals divided by the splitter and generating different frequency signals, the signal generating sections being connected to the signal output port of the splitter.

In accordance with the present invention, when base stations A and B use frequency channels different from each other and a user moves from the base station A to the base station B, pilot information the same as CDMA allocation frequency used by the base station A is supplied to the hardware of the base station B, to allow one piece of pilot information to be commonly used in a plurality of CDMA allocation frequencies. Furthermore, when the hardware of the base station A transmits the pilot channel the same as the CDMA allocation channel used by the base station B, the user's mobile can monitor the power intensities of the pilot channels of the two base stations A and B at the same time, resulting in smooth hand-off.

When base stations A and B use frequency channels different from each other and a user moves from the base station A to base station B, pilot information the same as CDMA allocation frequency used in the base station A is supplied to the hardware of the base station B, and the hardware of the base station B transmits a virtual pilot channel identical to CDMA allocation channel used in the base station A, to allow the user's mobile to simultaneously monitor power intensities of the pilot channels of the base stations A and B, initiating smooth hand-off.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DETAILED DESCRIPTION OF PREFERRED EMBODIMENT

Reference will now be made in detail to the preferred embodiments of the present invention, examples of which are illustrated in the accompanying drawings.

Figure 1:
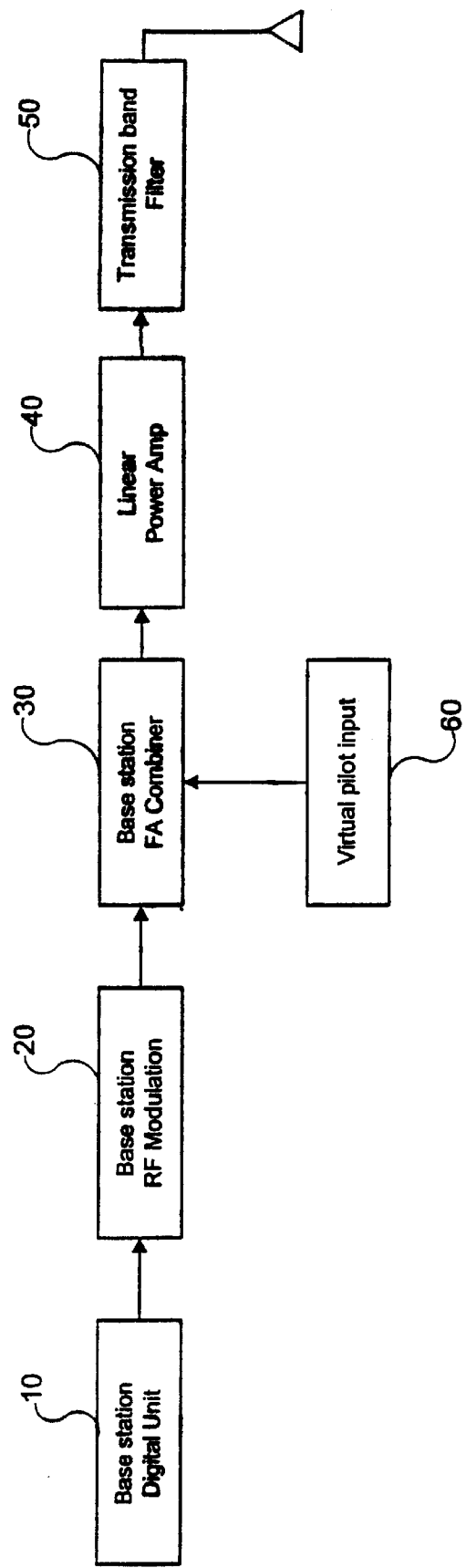
FIG. 1 is a block diagram illustrating a configuration of a system using a virtual pilot channel apparatus according to the present invention.

FIG. 1 is a block diagram illustrating a rough configuration of a base station system to which the virtual pilot channel of the invention is applied. Referring to FIG. 1, the base station system includes: a digital unit 10 for performing digital conversion to generate an intermediate frequency signal; a signal converter 20, connected to the output port of digital unit 10, for receiving the signal output from digital unit 10 and converting it into a high frequency signal; a first combiner 30, connected to the signal output ports of signal converter 20 and a virtual pilot channel generator 60, for combining signals applied from them; an amplifier 40, connected to the signal output port of first combiner 30, for receiving the signal output from first combiner 30 and amplifying it; a transmission band filter 50, connected to the signal output port of amplifier 40, for receiving the signal output from amplifier 40 and cutting off its frequency bands other than a transmission band; and virtual pilot channel generator 60 for generating a virtual pilot channel and providing first combiner 30 with it.

The base station system constructed as above operates in such a manner that, when virtual pilot channel generator 60 generates the virtual pilot signal and the intermediate frequency signal output from digital unit 10 is converted into the high frequency signal by signal converter 20, first combiner 30 receives the high frequency signal and virtual pilot channel signal and combines them, amplifier 40 amplifies the signal output from first combiner 30 to a signal with high radiation power, and transmission band filter 50 filters unnecessary signals and radiates only necessary signal.

Figure 2:
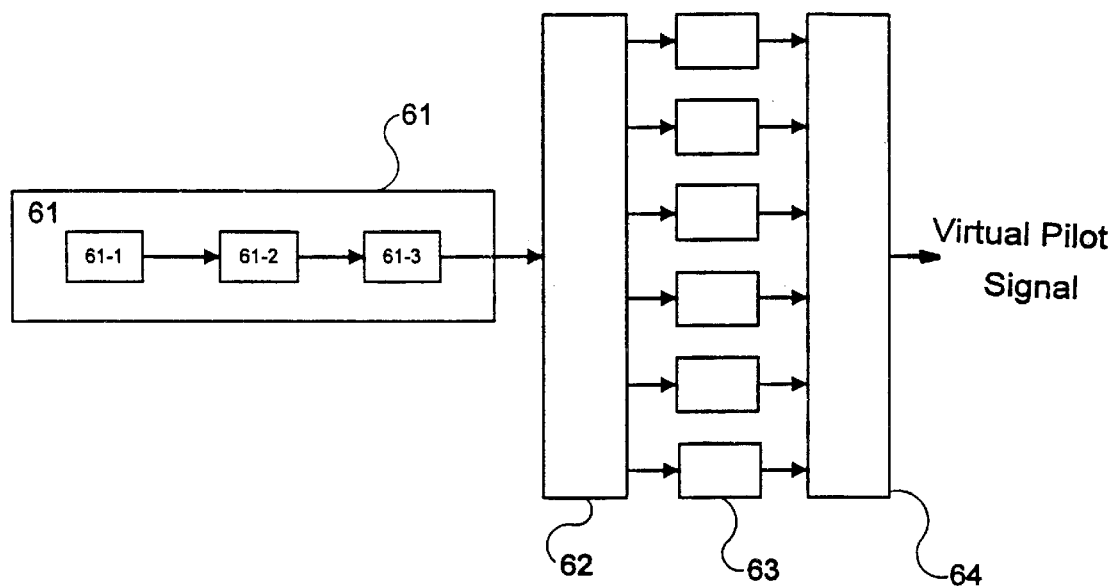
FIG. 2 is a block diagram illustrating a configuration of a virtual pilot channel generating apparatus according to the present invention.

FIG. 2 is a block diagram illustrating a configuration of virtual pilot channel generator 60 according to the present invention. Referring to FIG. 2, virtual pilot channel generator 60 includes: a virtual pilot channel source board 61 for providing a splitter 62 with a source for generating the virtual pilot channel; splitter 62, connected to virtual pilot channel source board 61, for splitting a virtual pilot signal output from virtual pilot channel source board 61 into a plurality of identical signals, to generate a plurality of virtual pilot channels different from one another; a plurality of virtual pilot signal generating section 63, connected to splitter 62, for receiving signals output from splitter 62 and generating a plurality of virtual pilot channel signals different from one another; and a second combiner 64, commonly connected to the signal output ports of the plurality of virtual pilot signal generating sections 63, for combining the plurality of virtual pilot signals and sending the combined signal to first combiner 30.

Virtual pilot channel source board 61 includes a channel element transmission path section 61-1 for CDMA-modulating data received from other base stations, an analog common card 61-2 for spreading the data transmitted from channel element transmission path section 61-1 and transmitting it to a sector board interface card transmission path section 61-3, and sector board interface card transmission path section 61-3 for modulating the data transmitted from analog common card 61-2 in QPSK (Quadrature Phase Shift Keying) mode and sending it to splitter 62.

Figure 3:
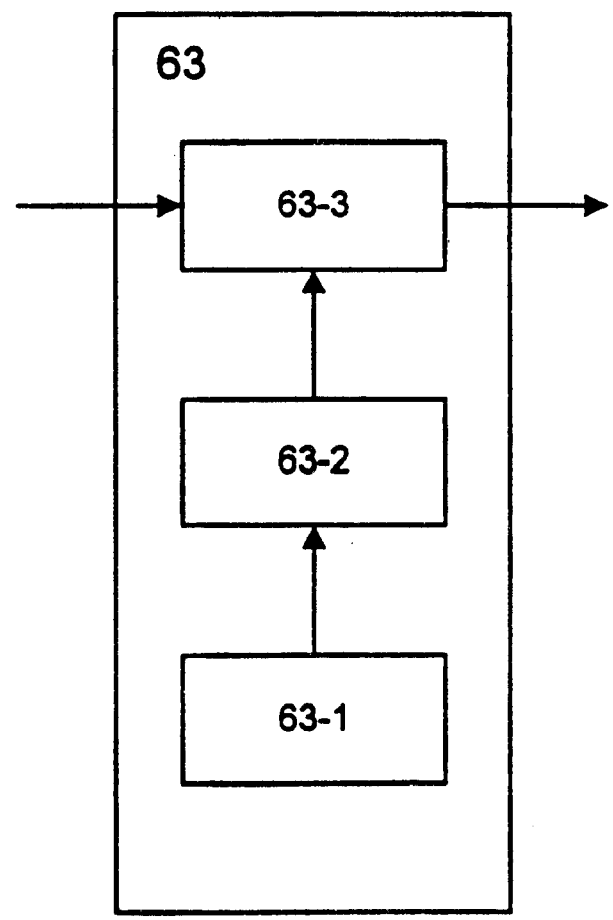
FIG. 3 is a block diagram illustrating a configuration of a signal generating section of the virtual pilot channel apparatus according to the present invention.

Each virtual pilot signal generating section 63, as shown in FIG. 3, includes: a local frequency information providing section 63-1 for providing a local frequency generating section 63-2 with information about a local frequency to be changed, that is, information about CDMA allocation frequency used by another base station, for example, information on the frequency of the base station A, which is provided to the base station B; local frequency generating section 63-2 for generating a local frequency for creating a desired CDMA allocation frequency using the information supplied from local frequency information providing section 63-1, and transmitting it to a frequency up-converting section 63-3; frequency up-converting section for generating a virtual pilot channel using a source signal supplied from splitter 62 and local frequency supplied from local frequency generating section 63-2.

In the construction of the above-described system, a 6-way splitter, which splits the signal transmitted from sector board interface card transmission path section 61-3 into six signals, is used as splitter 62, and six virtual pilot channel generators 63 are used for generating six different virtual pilot channel signals using the split six signals. While the 6-way splitter and six virtual pilot channel generators are employed in this embodiment since one base station uses seven channels in CDMA communications, they can be changed depending on the number of channels used by the base station.

Second combiner 64 is employed to combine the multiple virtual pilot signals into one because first combiner 30 has one virtual pilot signal input port. Second combiner may be omitted in the system according to the number of virtual pilot signal input ports of first combiner 30. The virtual pilot channels are generated in such a manner that virtual pilot channel source board 61 transmits a source signal for generating the virtual pilot signals to splitter 62 which splits the source signal into six signals and sends each of them to frequency up-converter 63-3 of each virtual pilot channel generator 63. Furthermore, when local frequency information providing section 63-1 provides local frequency generating section 63-2 with information about the local frequency to be generated, local frequency generating section 63-2 generates the local frequency for creating a desired CDMA allocation frequency according to the information data provided by local frequency information providing section 63-1 and sends it to frequency up-converting section 63-3 which creates the desired CDMA allocation frequency, that is, virtual pilot channel, using the local frequency sent from local frequency generating section 63-2 and frequency signal sent from splitter 62.

For example, when it is assumed that base station A is using all channels 1 to 7, another base station B is using only channel 2 and a user is moving from the base station A to base station B, first of all, pilot information the same as CDMA allocation frequency used by the base station A is provided to virtual pilot channel source board 61 which is source providing means and to local frequency information providing section 63-1 which is information providing means of the hardware of the base station B. Here, virtual pilot channel source board 61 is provided with fundamental information of channels used by the base station A, and each of six local frequency information providing sections 63-1 is provided with information about each of six channels other than the channel 2.

The information supplied to virtual pilot channel source board 61 is CDMA-modulated through channel element transmission path section 61-1 and this CDMA-converted data is spread by analog common card 61-2 to the frequency used by the base station. The spread data is modulated in QPSK mode by sector board interface card transmission path section 61-3, and then divided into six signals by splitter 62, being sent to frequency up-converting section 63-3 of each virtual pilot channel generator 63. When the information supplied to local frequency information providing section 63-1 is transmitted to local frequency generating section 63-2 which generates the local frequency for creating the virtual pilot channel according to the information and sends it to frequency up-converting section 63-3, frequency up-converting section 63-3, which is frequency converting means, generates the virtual pilot channel according to the information provided by local frequency generating section 63-2.

With the generation of the virtual pilot channel, there is no need for the user to wait for the generation of the virtual pilot channel of the base station B for the channel currently being used in the base station A when hand-off is carried out from the base station A to base station B because frequency up-converting section 63-3 of each of the six virtual pilot channel generators 63 simultaneously creates each of the virtual pilot channels for the six channels other than the channel 2. In other words, hand-off from the base station A to base station B is possible for the channel being used even if, when a user using another channel performs handing-off from the base station A to base station B, the hand-off according to the user of another channel is not completed. Accordingly, simultaneous hand-off for multiple channels can be realized.

As described above, in case that a mobile in the base station B generates a frequency signal identical to that used in the base station A, that is, a virtual pilot channel, and sends it to another mobile, this another mobile can monitor the power intensity of the pilot channels of the base stations A and B at the same time, making smooth hand-off possible. The present invention provides the virtual pilot channel generating apparatus and its operating method, thereby supporting effective hand-off between frequencies in a CDMA mobile communications system.

It will be apparent to those skilled in the art that various modifications and variations can be made in the virtual pilot channel generating apparatus and its operating method for supporting effective hand-off between frequencies in a CDMA mobile communications system of the present invention without departing from the spirit or scope of the invention. Thus, it is intended that the present invention cover the modifications and variations of this invention provided they come within the scope of the appended claims and their equivalents.

What is claimed is:

1. A virtual pilot channel generating apparatus for supporting effective hand-off between frequencies in a CDMA mobile communications system, the apparatus comprising:

source supplying means for supplying a source required for generating a virtual pilot channel;

a splitter for splitting information on the source provided by the source supplying means into a plurality of signals, the splitter being connected to the signal output port of the source supplying means, wherein the splitter is a 6-way splitter which splits a signal transmitted from a sector board interface card transmission path section into six signals, and the apparatus employs six virtual pilot channel generators for generating six virtual pilot channel signals using the six signals divided by the splitter; and a plurality of signal generating sections for receiving the plurality of signals divided by the splitter and generating different frequency signals, the signal generating sections being connected to the signal output port of the splitter, wherein each of the plurality of signal generating sections comprises a local frequency information providing section for providing a local frequency generating section with information about a local frequency to be changed, which is information about CDMA allocation frequencies used by other base stations;

local frequency generating section for generating a local frequency for creating a desired CDMA allocation frequency using the information provided by the local frequency information providing section, and transmitting it to a frequency up-converting section; and frequency up-converting section for generating said virtual pilot channel using a source signal supplied from the sitter and the local frequency generated by the local frequency generating section.

2. The apparatus as claimed in claim 1, wherein the source supplying means comprises:

a channel element transmission path section for CDMA-modulating data received from other base stations;

an analog common card for spreading said CDMA-modulating data transmitted from the channel element transmission path section into a frequency used by a base station, and sending it to a sector board interface card transmission path section; and sector board interface card transmission path section for modulating data sent from the analog common card in QPSK mode, and sending it to the splitter.

3. The apparatus as claimed in claim 1, further comprising a combiner for combining a plurality of virtual pilot signals to one port, the combiner being commonly connected to the signal output ports of the plurality of signal generating sections.

4. A method of operating a pilot channel for supporting an effective hand-off wherein base stations A and B use frequency channels different from each other, the method comprising the steps of:

transmitting a first CDMA allocation channel pilot signal from a plurality of signal generating sections in base station A with a uniform power to the user mobile station, transmitting a second CDMA allocation channel pilot signal from a plurality of signal generating sections in base station B with said uniform power to the user mobile station, receiving the first and second CDMA allocation channel pilot signals at the user mobile station, and monitoring simultaneously the power intensities of the transmitted first and second CDMA allocation channel pilot signals at the user mobile station for the purpose of supporting effective hand-off between frequencies, wherein, the pilot channel information is the same as the CDMA allocation frequency used in the base station A and is supplied to the hardware of the base station B which transmits the virtual pilot channel which is identical to CDMA allocation channel used in the base station A to allow a user's mobile to simultaneously monitor power intensities of the pilot channels of the base stations A and B.

* * * * *